United States Patent [19]
Fonseca et al.

[11] 3,967,860
[45] July 6, 1976

[54] METHOD OF TRANSPORTING A SULFUR-HYDROCARBON SLURRY IN A PIPELINE

[75] Inventors: Anthony G. Fonseca; Richard L. Every, both of Ponca City, Okla.

[73] Assignee: Continental Oil Company, Ponca City, Okla.

[22] Filed: Nov. 2, 1972

[21] Appl. No.: 303,300

[52] U.S. Cl. .............................................. 302/66
[51] Int. Cl.² ........................................ B65G 53/30
[58] Field of Search ............................... 302/14–16, 302/66

[56] References Cited
UNITED STATES PATENTS

| | | | |
|---|---|---|---|
| 3,517,969 | 6/1970 | Wicks | 302/66 |
| 3,630,212 | 12/1971 | Martin | 302/66 X |

*Primary Examiner*—Evon C. Blunk
*Assistant Examiner*—Jeffrey V. Nase

[57] ABSTRACT

The present invention relates to an improved method of transporting a sulfur-hydrocarbon slurry in a pipeline with a minimum of sulfur precipitation and adherence to the internal parts of the pipeline system. The improvement comprises maintaining the flow rate of the slurry to at least about the value given by the equation flow rate (feet per second) = 0.16 [$\Delta T(°F)-5$]

when the flow rate is below 8.0 feet per second, to thereby prevent the plating of sulfur on the walls of the pipeline by the precipitation of the dissolved sulfur in the sulfur-hydrocarbon slurry.

8 Claims, 1 Drawing Figure

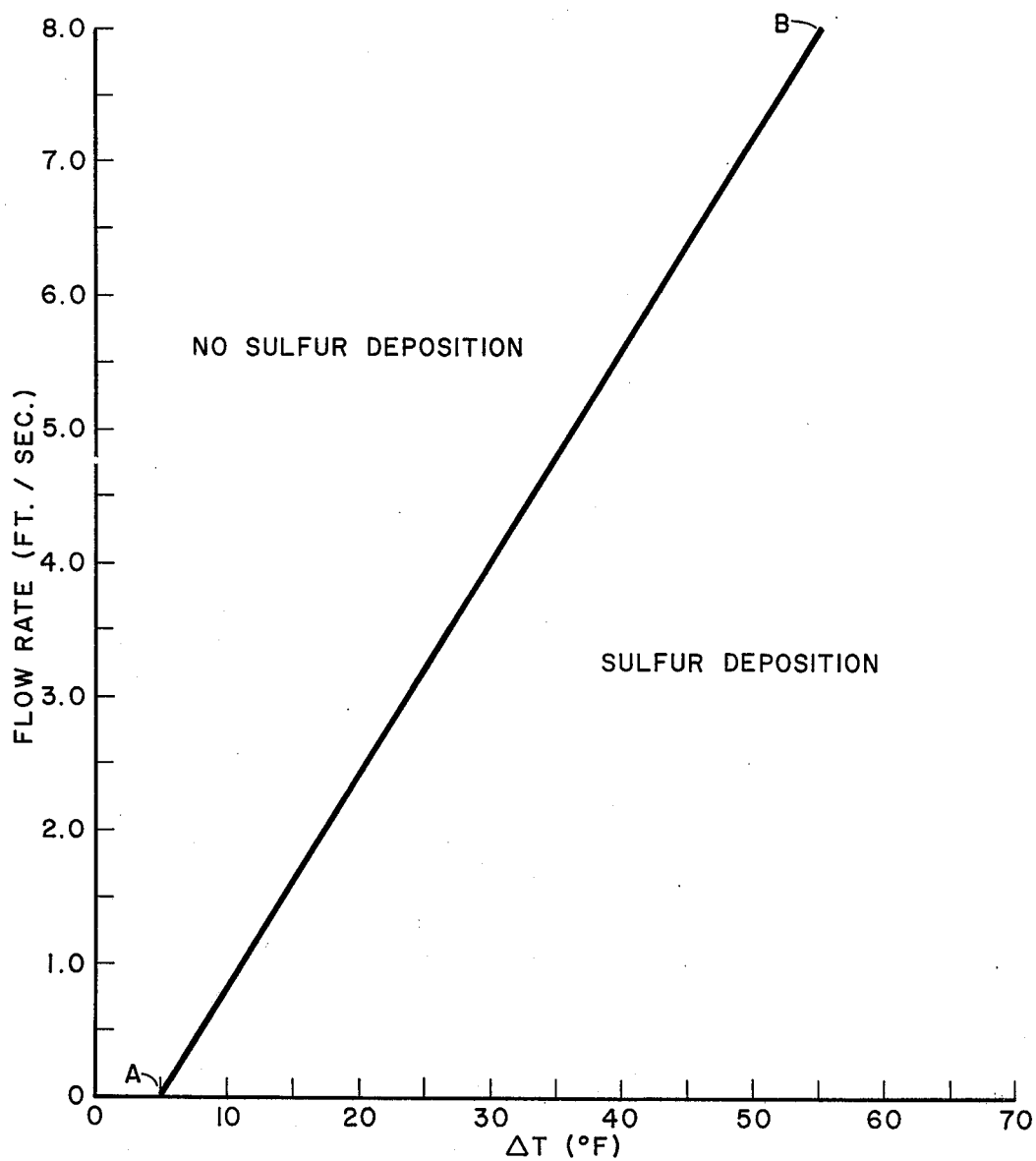

METHOD OF TRANSPORTING A SULFUR-HYDROCARBON SLURRY IN A PIPELINE

The present invention relates generally to an improved method of transporting sulfur in a pipeline. More particularly, the present invention concerns the transporting of a sulfur-hydrocarbon slurry in a pipeline. And more particularly, the present invention pertains to the prevention of sulfur plating on the interior walls of a pipeline through which a sulfur-hydrocarbon slurry is being transported.

Until recently sulfur, which is a high tonnage commodity, has been moved entirely by conventional methods of rail, truck and ships. Even though slurry pipelines are a reality, no sulfur slurry pipeline has been constructed due to the difficulties in handling sulfur. Most of these difficulties have been associated with the tendency of sulfur to "plate-out", i.e. to form a hard deposit on the internal wall of a pipeline. This accumulation of very difficult to remove sulfur leads to restricted flow and excessive power costs in the transporting of same. Sulfur in one form or another is associated with hydrocarbon condensate in various parts of the world.

It has recently been proposed to transport sulfur between locations separated by substantial distances by pipeline. More specifically the formation of a pumpable slurry which may be pumped through a pipeline linking two locations has been proposed. Such pipeline transport is used to remove sulfur as well as the carrier fluids from sites where sulfur is produced or stock-piled and the carrier fluid is available from crude materials, refineries or other processing plants. However, the continuing problem encountered in the transportation of sulfur slurries by pipeline has been the propensity of the sulfur to precipitate and adhere to the internal parts of the pipeline system, particularly, walls, valves, fittings, loops, turns or joints in the pipeline. This precipitation or plating-out seriously reduces the operational efficiencies of the pipeline system requiring increased maintenance and causing contamination of the pipeline to a degree which presents serious problems if it is desired to use the same pipeline for transporting other materials in a relatively high state of purity.

The present invention provides an improved method of transporting sulfur in a pipeline wherein a minimum of precipitation and adherence of the sulfur to the internal parts of the pipeline system is encountered.

Therefore, it is an object of the present invention to provide the art with an improved method of transporting sulfur in a pipeline.

A further object of the present invention is to provide the art with an improved method of transporting a sulfur-hydrocarbon slurry in a pipeline.

A further object of the present invention is the provision of an improved method of transporting a sulfur-hydrocarbon slurry in a pipeline wherein a minimum quantity of sulfur precipitates and adheres to the internal parts of the pipeline system.

Another object of the present invention is to provide the art with an improved method of transporting a sulfur-hydrocarbon slurry in a pipeline wherein the propensity of the dissolved sulfur in a sulfur-hydrocarbon slurry to deposit or plate-out on the walls of the pipeline system is decreased.

These and other objects of the present invention will become apparent from a reading of the following description.

It has now been found that the objects of the present invention can be attained in a method of transporting sulfur in a pipeline by forming a pumpable slurry of said sulfur and pumping said slurry through said pipeline, by maintaining the flow rate of said slurry to at least about the value given by the equation:

$$\text{flow rate (ft/sec)} = 0.16\,[\Delta T(°F) - 5].$$

when operating at a flow rate of less than 8.0 ft/sec, to inhibit the deposition of dissolved sulfur from said slurry while in transit.

In the operation of the improved method to inhibit the deposition of dissolved sulfur from a slurry while in transit through a pipeline, the flow rate of the slurry and the temperature gradient ($\Delta T$, the number of degrees farenheit that the pipeline itself is colder than the slurry) are the critical factors which effect the solubility of the sulfur in the carrier fluid, and it is solubility which determines the amount of deposition of dissolved sulfur on the internal parts of the pipeline.

If the temperature of the pipeline itself is maintained so as to be no more than 5°F lower than the temperature of the slurry no deposition of dissolved sulfur occurs, even if in a quiescent state. If the temperature of the pipeline is more than 5°F colder than the temperature of the slurry, plating of nascent sulfur on the interior walls of the pipeline occurs unless the flow rate is of sufficient amount to prevent such deposition. This temperature differential can be maintained by a variety of means including insulation of the pipe and external heating of the pipe. By maintaining this temperature differential the sulfur, hydrocarbon slurry can be pumped through a pipeline over substantial distances without the occurrence of sulfur precipitation or adherence to the internal walls of the pipeline to an unacceptable degree.

The present invention is based on the discovery that the tendency of sulfur to precipitate or plate out on the walls of the pipe is largely caused by the deposition of dissolved sulfur from the slurry due to the solubility differences caused by the temperature differential between a warm circulating slurry and a cold pipeline. It should be noted that the dissolution of any material is a continuing process and does not stop when the saturation level is reached. The process continues by dissolving more material, in this case sulfur, and depositing a similar amount of previously dissolved material, sulfur, as crystals or precipitated product.

It has been found that this plated or nascent sulfur, which has caused the most problems in slurry pipelining, is crystalline in nature which results only from the deposition of dissolved sulfur.

The improved method of the present invention is applicable to slurries prepared from prilled, powdered or crushed sulfur.

It has further been found that a velocity or flow rate of sufficient amount will prevent this deposition of sulfur even if the temperature differential as previously explained is not maintained within the stated limit. In order to prevent the deposition of sulfur, the slurry should be transported at a flow rate of no less than about 8.0 feet per second. The combination of a flow rate of more than 8.0 feet per second and the pipeline being no colder than 5°F than the slurry, will conclusively inhibit the plating out of the nascent sulfur on the interior walls of the pipeline.

It has also been found that when operating at a flow rate of less than 8.0 feet per second and with a temperature gradient of more than 5°F, at a given ΔT there is a corresponding minimum flow rate which is required to inhibit the deposition of dissolved sulfur on the internal parts of the pipeline. This minimum flow rate may be calculated using the equation:

$$\text{flow rate (ft/sec)} = 0.16 [\Delta T(°F) - 5]$$

which was derived from line AB of the attached FIGURE.

The FIGURE represents the relationship between the flow rate and the temperature gradient of a sulfur slurry in a pipeline and their effect on sulfur deposition. Referring to the FIGURE, line AB depicts the minimum flow rate for a given ΔT which is necessary to inhibit sulfur deposition. Point B of line AB illustrates that at a ΔT of 55°F a minimum flow rate of 8.0 feet per second is required. Point A of line AB illustrates that at a ΔT of 0°–5°F no flow is necessary to prevent sulfur deposition. Therefore, although line AB represents the minimum flow rates necessary for a given ΔT to inhibit sulfur deposition, for a given ΔT any flow rate which is higher than the minimum required will be sufficient.

The only significant limitation on the viscosity of the slurry used for transporting the sulfur is that it be sufficiently low to be pumpable. It is preferable, however, to assure ease of movement through the pipeline that the horsepower requirements to pump the sulfur through the pipeline not exceed 1.8 × the horsepower requirement to move the pure fluid carrier through the pipeline.

The type of fluid carrier employed is not particularly critical but should preferably be a nonsolvent for sulfur, or at least dissolve the sulfur to no greater extent than 5% by weight. Transporting the sulfur by the improved method of the present invention is advantageous in that the fluid carrier may be a material which is desirable to move from the origination of the sulfur shipment to the destination point. Since petroleum derivatives are frequently available near the sulfur deposits, particularly in the United States, preferred carrier materials include but are not limited to such petroleum derived fluids as crude oils, sour crude oil condensates, sour gas condensates, crude oil distillates, kerosene and benzene.

The present invention can be better understood by referring to the following examples of its practice.

Laboratory tests were made which illustrate the improved results achieved by the method of the present invention.

Various tests were made to determine the effect of temperature differences between pipeline and the slurry circulated therethrough and the effect of flow rate on sulfur deposition. The equipment used and the procedure followed in the tests were substantially as follows.

The test loop was a closed circuit with the slurry recirculating through the 140-gallon head tank. The pump motor (25 hp) was coupled to the pump with a Gyrol fluid coupling. The pump itself had a 4-inch intake, 3-inch outlet and was used with a 10-inch impeller.

Pressure drops (friction head loss) across the length of the 2-inch I.D. line were measured by two pressure transducers checked against a mercury column. The test section was 147 feet in length, equivalent to 153.2 feet of straight line due to a 180° bend and two gate valves. The line was elevated 5 feet above the ground and was level.

The head tank was connected to the pump suction by a 4-inch line. The slurry was continuously returned to the head tank for recirculation. The head tank was equipped with an 8-inch agitation blade controlled by a variable speed motor.

In the return line was a cold trap (cold joint) 25 inches long. Gate valves on either side of the section permitted the trap to be removed while the loop was loaded. An 18-inch Plexiglass sight glass was also added in the return line to permit visual observation.

The condensate was used as received while the sulfur was either prilled or crushed to −2 mesh. The slurry loop tests were performed as follows: a known weight of condensate was added to provide sufficient volume to fill the line with a slight excess. After checking the hydraulics of the circulating fluid, the desired amount of sulfur was added to the holding tank while constantly stirring and maintaining circulation through the line. This procedure prevented plugging the pump. The circulating system reached equilibrium quite rapidly, usually within 2–4 minutes after all sulfur was added.

EXAMPLE 1

A 10-hour slurry test of 50 weight percent crushed sulfur in diesel was run with the cold joint loaded with ice-water mixture. The high temperature of the day was 97°F. The flow rate varied from 8.8 to 8.2 feet per second for the duration of the run. Examination of the cold joint at the completion of the test showed no accumulation or plating of any sulfur. There were a few spots of powdered sulfur left by draining of the pipe section, but there was no sulfur adhering to the walls of the pipe.

EXAMPLE 2

A 10-hour slurry test of 50 weight percent crushed sulfur was run with the cold joint loaded externally with an ice-water mixture. The high temperature for the day was 89°F. The flow rate varied from start of 7.7 feet per second to 7.4 feet per second at the end of the test. The cold joint showed approximately 3/64-inch very hard crystalline accumulation of sulfur. Examination of another section of loop which had remained at ambient temperature showed no accumulation or plating of sulfur. The plated sulfur was crystalline in nature which can result only from deposition of dissolved sulfur due to solubility differences caused by the temperature differential between the warm circulating slurry and the cold joint.

Although certain specific embodiments of the invention have been described as exemplary of its practice the examples are not intended to limit the invention in any way. Other process parameters and materials may be used in accordance with the broad principles outlined herein and when so used are deemed to be circumscribed by the spirit and scope of the invention except as necessarily limited by the appended claims or reasonable equivalents thereof.

Therefore, we claim:

1. In a method for transporting sulfur in a pipeline by forming a pumpable slurry of said sulfur and a carrier fluid, pumping said slurry through said pipeline, in order to inhibit the plating on the walls of said pipeline of nascent sulfur from said slurry while in transit due to the solubility differences caused by the temperature differential ($\Delta T$) between said slurry and said pipeline, the improvement comprises maintaining the flow rate of said slurry to at least about the value given by the equation:

$$\text{flow rate (ft/sec)} = 0.16 \, [\Delta T(°F) - 5]$$

when the flow rate is below 8.0 feet per second.

2. The improvement of claim 1 wherein said carrier fluid is a hydrocarbon.

3. The improvement of claim 2 wherein said hydrocarbon is crude oil.

4. In a method for transporting sulfur in a pipeline by forming a pumpable slurry of said sulfur and a carrier fluid, pumping said slurry through said pipeline, in order to inhibit the plating on the walls of said pipeline of nascent sulfur from said slurry while in transit, the improvement comprises maintaining said pipeline at a temperature of no more than 5°F below the temperature of said slurry.

5. The improvement of claim 4 wherein said carrier fluid is a hydrocarbon.

6. The improvement of claim 5 wherein said hydrocarbon is crude oil.

7. The improvement of claim 4 wherein said temperature differential is maintained by insulating the exterior of said pipeline.

8. The improvement of claim 4 wherein said temperature differential is maintained by externally heating said pipeline.

* * * * *